(12) United States Patent
Janczak et al.

(10) Patent No.: US 9,688,266 B2
(45) Date of Patent: Jun. 27, 2017

(54) TORQUE-GENERATING SYSTEM AND METHOD WITH IMPROVED POWER DOMAIN-BASED CONTROL AT ZERO SPEED

(71) Applicant: GM GLOBAL TECHNOLOGY OPERATIONS LLC, Detroit, MI (US)

(72) Inventors: John J. Janczak, Commerce Township, MI (US); Eric Piper, Fenton, MI (US); Jeffrey J. Waldner, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/859,801

(22) Filed: Sep. 21, 2015

(65) Prior Publication Data

US 2017/0080915 A1 Mar. 23, 2017

(51) Int. Cl.
*B60W 10/04* (2006.01)
*B60W 20/10* (2016.01)
*B60W 10/06* (2006.01)
*B60W 10/08* (2006.01)
*B60W 30/19* (2012.01)

(52) U.S. Cl.
CPC ............ *B60W 20/10* (2013.01); *B60W 10/06* (2013.01); *B60W 10/08* (2013.01); *B60W 30/19* (2013.01); *B60W 2540/00* (2013.01); *Y10S 903/902* (2013.01)

(58) Field of Classification Search
CPC combination set(s) only.
See application file for complete search history.

(56) References Cited

U.S. PATENT DOCUMENTS

| | | | |
|---|---|---|---|
| 6,188,943 B1 * | 2/2001 | Uchida | B60W 10/02 192/3.54 |
| 6,994,360 B2 * | 2/2006 | Kuang | B60K 6/445 180/65.235 |
| 8,473,133 B2 * | 6/2013 | Wang | B60W 10/06 180/65.265 |

* cited by examiner

*Primary Examiner* — Edward J Pipala
(74) *Attorney, Agent, or Firm* — Quinn IP Law

(57) ABSTRACT

A torque-generating system includes one or more torque-generating devices, a transmission having an output member, and a controller. The controller executes a method to control an operation of the system when the output member is operating at zero output speed. The controller is programmed to determine a torque request level and an actual speed of the output member, and an effective speed of the output member, as a calibrated non-zero value, using the torque request level when the determined actual speed is zero. The controller calculates an effective power of the powertrain using the effective speed and torque request level. A control action is executed with respect to the powertrain using the calculated effective power, including transmitting powertrain control signals to the torque-generating device(s) to select an appropriate powertrain operating mode.

20 Claims, 2 Drawing Sheets

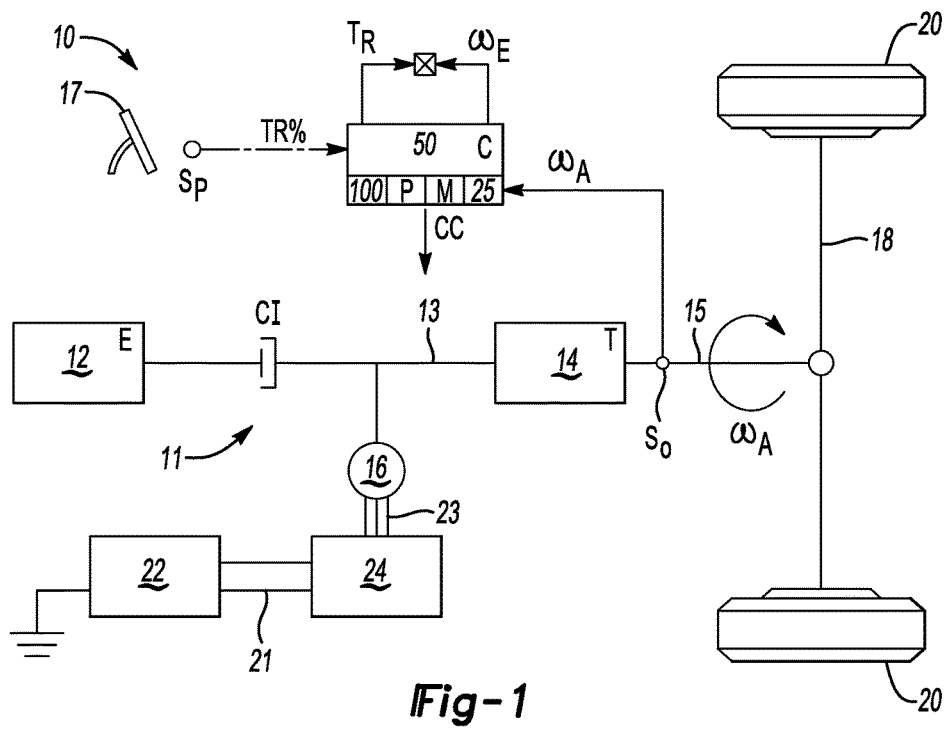
Fig-1
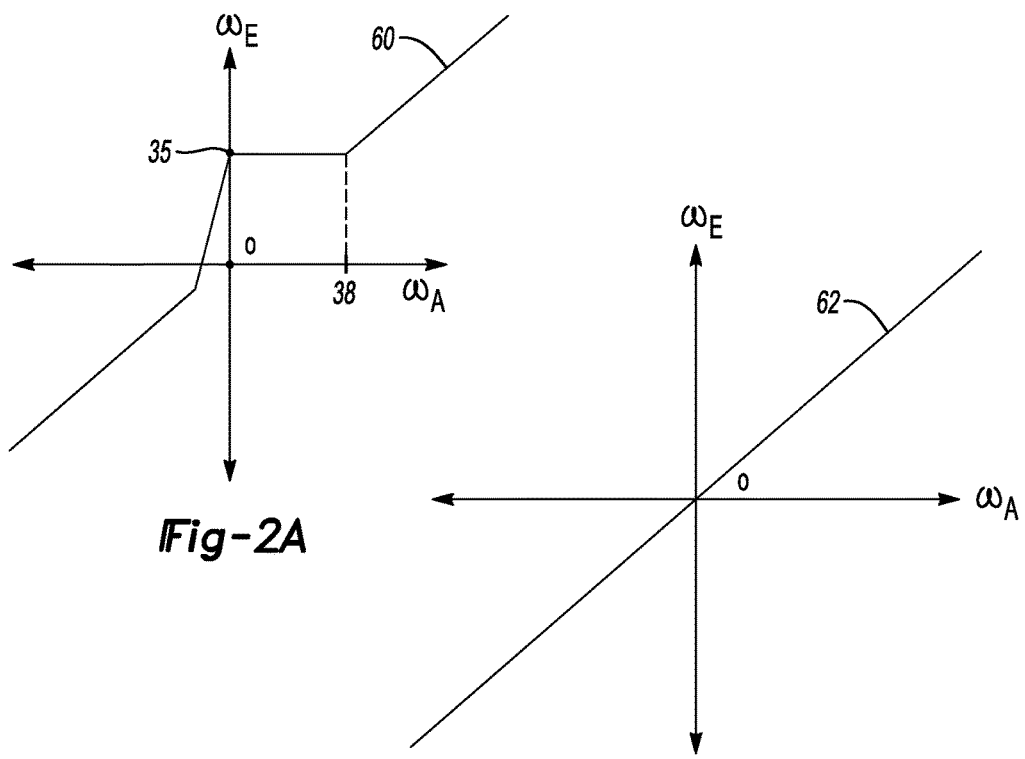
Fig-2A
Fig-2B

US 9,688,266 B2

TORQUE-GENERATING SYSTEM AND METHOD WITH IMPROVED POWER DOMAIN-BASED CONTROL AT ZERO SPEED

TECHNICAL FIELD

This disclosure relates to a torque-generating system having improved power domain-based control at zero speed.

BACKGROUND

Vehicle powertrains and other complex torque-generating systems are typically controlled in response to a requested output torque as a function of the system's available output torque. Torque-based control, also known as control in the torque domain, provides a single control degree of freedom in the form of available output torque. For example, conventional vehicle powertrains are controlled in the torque domain using a driver's output torque request, which in turn is determined as a function of torque request level and calibrated set of powertrain-unique gear mapping.

By way of contrast, in a power domain-based control system, or control of a system in the power domain, a controller considers the total amount of mechanical power that can be generated by any number of torque-generating devices of the system, such as internal combustion engines and electric motors, as well as all power losses incurred in the system. Control in the power domain provides two control degrees of freedom, i.e., both torque and speed. As a result, power domain-based control may be particularly useful when applied to hybrid electric powertrains and other complex systems having more than one torque-generating device.

SUMMARY

A torque-generating system and method are disclosed herein that are intended to improve upon existing power domain-based control strategies, specifically when the torque-generating system is operating at or near zero speed. In an example embodiment, the torque-generating system may be embodied as a hybrid electric vehicle powertrain having two or more torque-generating devices, e.g., an internal combustion engine and one or more electric machines. Other embodiments may be envisioned within the intended inventive scope, such as a stationary power plant in a non-vehicular example.

It is recognized herein that while power domain-based control strategies provide certain performance advantages due in part to the additional control degree of freedom provided relative to torque domain-based control, power-based control calculations tends to break down when the system being controlled is operating at or very near zero output speed. That is, power is the product of output torque and speed, and therefore an output speed of zero corresponds to zero output power. Typical power domain-based control systems thus ineffectively differentiate across various levels of output torque request when a system is at or near zero speed. The present disclosure is intended to help address this particular control problem and thereby improve upon the overall performance of the torque-generating system.

In an example embodiment, a torque-generating system includes at least one torque-generating device, a transmission, and a controller. The transmission includes an output member. The controller is configured to control an operation of the powertrain when the output member is operating at zero output speed. The controller is programmed to determine a torque request level and an actual speed of the output member, and to ultimately determine an effective speed of the output member as a calibrated non-zero value. The effective speed is determined using the torque request level, e.g., a percentage engine throttle request and/or motor torque request depending on the embodiment, when the actual speed is zero. The controller also calculates an effective power of the powertrain using the determined effective speed and torque request level. A control action that is executed with respect to the system using the calculated effective power includes transmitting powertrain control signals to the torque-generating device(s) to select an appropriate powertrain or other operating mode.

A method for controlling a torque-generating system at zero output speed is also disclosed. The method includes determining a torque request level and an actual speed of the output member, and also determining an effective speed of the output member as a calibrated non-zero value. The effective speed is determined as a function of the torque request level when the actual speed is zero. The method also includes calculating an effective power of the powertrain using the determined effective speed and the determined torque request level. A control action is executed with respect to the torque-generating system using the calculated effective power. The control action may include transmitting powertrain control signals to the torque-generating device(s) to thereby select an appropriate operating mode of the system at the zero output speed.

The above features and advantages and other features and advantages of the present disclosure are readily apparent from the following detailed description of the best modes for carrying out the disclosure when read in conjunction with the accompanying drawings.

BRIEF DESCRIPTION OF THE DRAWINGS

FIG. 1 is a schematic illustration of an example vehicle having a controller programmed to provide power domain-based control at or near zero speed as set forth herein.

FIGS. 2A-C depict example embodiments of performance traces usable by the controller of FIG. 1, with the performance traces depicting effective speed, actual speed, and torque request level.

DETAILED DESCRIPTION

Figure 2C:
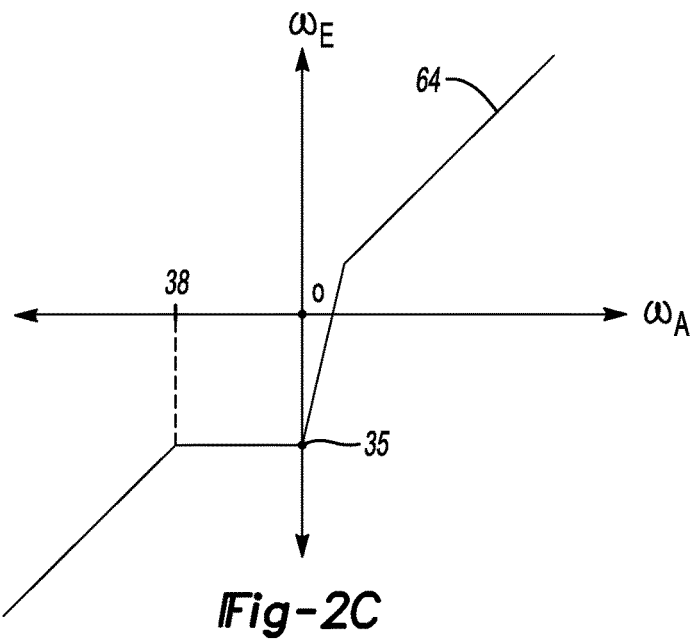

Referring to the Figures, wherein like numerals indicate like parts throughout the several views, an example torque-generating system 10 is depicted in FIG. 1 as an example automotive vehicle. One of ordinary skill in the art will appreciate that the torque-generating system 10 may be part of a non-automotive vehicle, or may be used in non-vehicular applications such power plants or manufacturing facilities. For illustrative consistency, the torque-generating system 10 of FIG. 1 will be described hereinafter in an example automotive vehicular context, and therefore will be referred to as the vehicle 10 without limiting the scope of the disclosure to such an embodiment.

The vehicle 10 of FIG. 1 includes a controller (C) 50 that is programmed with computer-readable instructions embodying a method 100. Execution of the instructions allows the controller 50 to provide improved power domain-based control of a powertrain 11 of the vehicle 10 when the vehicle 10 is operating at or near zero output speed. It is recognized herein that mechanical power of a rotational system operating at or near zero output speed is effectively zero, as noted above, regardless of the amount of output torque that is being produced. Therefore, the controller 50 is programmed to selectively provide a non-zero representation of the effective power of the vehicle 10, or more precisely, of any torque-generating components used in the powertrain 11. Such an approach is intended to allow the controller 50 to better differentiate between different torque request levels while the vehicle 10 is at zero output speed. An intended result of the method 100 is to allow power-based control logic to function in a more optimal manner without resorting to the use of multiple different control domains during zero speed conditions, with control conducted as a function of an amount of a requested output torque.

Figure 3:
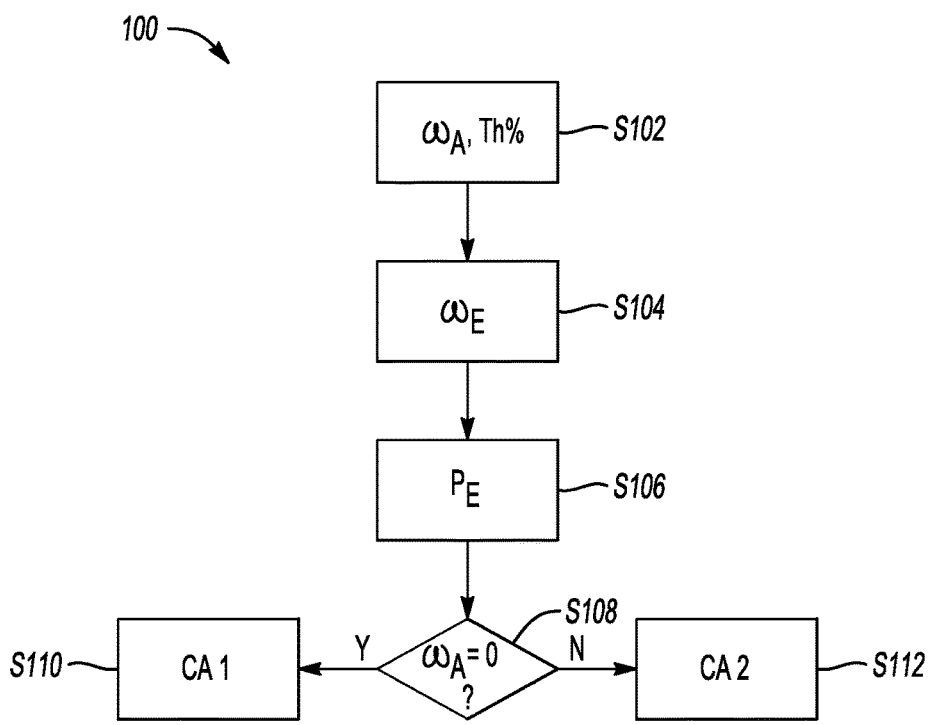
FIG. 3 is a flow chart depicting an example method for providing power domain-based control at or near zero speed in a torque-generating system.

The controller 50 of FIG. 1 may be configured as one or more digital computers specially programmed to execute the instructions embodying the method 100, an example of which is shown in FIG. 3. To that end, the controller 50 should include sufficient hardware to perform the required steps, for instance memory M and a processor P, as well as other hardware such as a high-speed clock, analog-to-digital and/or digital-to-analog circuitry, a timer, input/output circuitry and associated devices such as a transceiver, and signal conditioning and/or signal buffering circuitry. The memory M should include sufficient tangible, non-transitory memory such as magnetic or optical read-only memory, flash memory, etc., as well as random access memory, electrically erasable programmable read only memory, and the like. In some vehicle embodiments, the controller 50 may be a hybrid control module of the type known in the art.

The powertrain 11 may be embodied as a hybrid electric powertrain having an internal combustion engine (E) 12, a transmission (T) 14, and an electric machine 16. Additional electric machines 16 are not shown but may be used in other embodiments, as is well known in the art. The engine 12 may be connected to or disconnected from an input member 13 of the transmission 14 via an input clutch CI, e.g., a hydrodynamic torque converter or a friction clutch. An output member 15 of the transmission 14 may be connected to one or more drive axles 18 to deliver output torque to a set of drive wheels 20.

Electrical power aboard the vehicle 10 may be provided via a high-voltage energy storage system 22, e.g., a direct current (DC) battery pack and associated power electronics. The energy storage system 22 may be connected to a power inverter module 24, which as known in the art includes semiconductor switches and other electronic components responsive to pulse-width modulation or other switching signals so as to convert a DC output voltage from the energy storage system 22 into a polyphase voltage suitable for powering the electric machine 16 and vice versa.

Thus, as part of the architecture of the powertrain 11, a DC voltage bus 21 may electrically connect the high-voltage energy storage system 22 to the power inverter module 24, and an AC voltage bus 23 may electrically connect the power inverter module 24 to the electric machine 16. Additional components may be used as part of the electrical system feeding the various components of the powertrain 11, including for instance an auxiliary power module, an auxiliary battery, and one or more auxiliary voltage devices, which are omitted from FIG. 1 for illustrative simplicity.

The powertrain 11 shown in FIG. 1 is an example of a system that experiences power losses as a byproduct of energy conversion and storage. For example, fossil fuel combusted by the engine 12 can produce a known amount of available mechanical power. Analogously, electrical energy from the high-voltage energy storage system 22 can be used to produce a known amount of electrical power. However, the total power available for powering the drive wheels 20 is reduced from a sum of the available fuel and battery power by any power losses incurred through the powertrain 11. The fuel combustion process produces some losses, for instance, and electrical power losses are provided due to any electrical loads on the respective DC and AC voltage busses 21 and 23, as well as by operation of any low-voltage components. Additional mechanical power losses are experienced in the transmission 14 and the electric machine(s) 16. Inertia of the engine 12, braking system losses, and other possible losses further reduce the amount of available power that can be delivered to the drive axle(s) 18. It is therefore necessary for power domain-based control logic to properly consider such losses, and to ultimately determine the available output power that can be delivered to the drive wheels 20.

Mathematically, the output power of a torque-generating device is the product of the device's output torque and output speed. In the power domain, total power consumption of the vehicle 10 and a driver's requested output power are used as inputs to several powertrain selection functions. As is well known in the art, powertrain state selection functions are used in control logic to determine the most appropriate operating state to command given current operating conditions. In other words, the overall performance of the powertrain 11 is optimized by determining which components to turn on or off at any given moment, and by subsequently commanding the appropriate operating states.

The controller 50 of FIG. 1 therefore determines when to turn the engine 12 on or off, which gear of the transmission 14 to select, and whether and/or how much to charge or discharge the high-voltage energy storage system 22. The controller 50 also determines an appropriate input speed to the transmission 14 and an appropriate amount of engine torque to command from the engine 12. Powertrain control signals (arrow CC) are then transmitted by the controller 50 to the various components of the powertrain 11, including the engine 12, the transmission 14, the power inverter module 24, and the electric machine 16 so as to command a particular combination of fuel and electricity that ultimately minimizes power losses in the powertrain 11. All of the conventional selection functions may benefit from the use of effective power at zero speed, as described below, as effective power distinguishes between high-torque and low-torque levels at or near zero speed of the vehicle 10.

As part of the present control architecture, the controller 50 of FIG. 1 is programmed with an effective speed logic block 25. The effective speed logic block 25 may be embodied variously as one or more lookup tables indexed or referenced by torque request level (TR %) and an actual rotational speed ($\omega_A$) of the output member 15. The torque request level (TR %) and actual speed ($\omega_A$) may be measured by a respective position sensor ($S_P$) of an accelerator pedal 17 and a transmission output speed sensor ($S_O$) positioned with respect to the output member 15, or determined using other measured, calculated, or estimated speed values.

The torque request level (TR %) is a percentage or amount of output torque requested by a driver or other operator of the system 10. For example, if an accelerator pedal 17 and brake pedal are used to determine a driver's request, full application of the accelerator pedal with zero application of the brake pedal (not shown) may be considered to be a 100% torque request, or a request for all available torque from whatever powerplant the system 10 has available. The torque request level (TR %) is treated herein as being a suitable representation of a driver-requested output torque or axle torque request, i.e., the amount of output torque a driver of the vehicle 10 expects to receive in response to increased pressure on the accelerator pedal 17 or increased force or travel on another torque request input device. In other words, the controller 50 is programmed to determine, for any given torque request level (TR %), what the driver-requested output torque is in Newton-meters (Nm), e.g., via a lookup table or via calculation.

The controller 50 multiplies the driver-requested output torque and an effective speed determined using the effective power logic block 25 to determine an effective power value $P_E$, i.e., $T_R \cdot \omega_E = P_E$, where $T_R$ is the driver-requested output torque and ($\omega_E$) is the effective speed. As part of the method 100, therefore, the effective power logic block 25 represents any software and associated hardware elements of the controller 50 that collectively provide a calibrated effective speed at or near zero actual output speed so as to temporarily feed a calibrated torque request-indexed, non-zero speed value into any power-based selection decision processes of the controller 50.

For example, FIGS. 2A-C depict three possible profiles or data curves for determining effective speed ($\omega_E$) at zero speed conditions, with respective traces 60, 62, and 64 representing a calibrated correlation between actual speed ($\omega_A$) as plotted on the horizontal axis and effective speed ($\omega_E$) as plotted on the vertical axis, e.g., in the indicated data curve form or in a corresponding lookup table. FIG. 2A represents the effective speed ($\omega_E$) under positive torque request conditions, i.e., when a driver of the vehicle 10, or an operator of another torque-generating system, requests output torque in a positive or forward rotational direction. FIG. 2B represents the effective speed ($\omega_E$) at zero torque conditions when the driver/operator is not actively requesting any output torque, such as when no pressure is applied to the accelerator pedal 17 of FIG. 1. FIG. 2C represents the effective speed ($\omega_E$) under negative torque conditions, such as when the driver/operator is requesting output torque in a negative or reverse rotational direction.

Referring to FIGS. 2A and 2C, point 35 corresponds to maximum torque request, e.g., 100% apply or travel of the accelerator pedal 17 of FIG. 1. Such a scenario may be readily envisioned as the vehicle 10 idles at a red traffic light, followed by the driver fully depressing the accelerator pedal 17 when the traffic light turns green. As shown in FIG. 2A, once actual speed ($\omega_A$) is sufficiently non-zero as indicated by point 38, the actual speed ($\omega_A$) may be used by the controller 50 to control the powertrain 11. Thus, at a low or zero actual speed the controller 50 can substitute a calibrated effective speed ($\omega_E$) as determined by the effective speed logic block 25 noted above. A separate lookup table or curve, shaped similarly to that of FIGS. 2A and 2C or differently depending on the design, may be used for lower torque request levels at or near zero speed to provide a desired control response. For instance, separate lookup tables of performance curves could be programmed into memory M for 10-20% torque request, 21-30% torque request, 31-40% torque request, etc.

FIG. 2B depicts zero torque request conditions. Under such conditions, the effective speed ($\omega_E$) may be a linear function of torque request and actual speed ($\omega_A$) through the entire operating range. Such an approach treats the actual speed, as measured by the output speed sensor $S_O$ of FIG. 1, as being the effective speed and vice versa.

Referring to FIG. 3, an example embodiment of the method 100 begins with step S102, wherein the controller 50 of FIG. 1 receives the measured actual speed ($\omega_A$) and the measured torque request level (TR %) from the respective sensors $S_O$ and $S_P$, or otherwise determines these values. The method 100 then proceeds to step S104.

At step S104, the controller 50 processes the actual speed ($\omega_A$) and the measured torque request level (TR %) from step S102 via the effective speed logic block 25 to determine the effective speed ($\omega_E$). Step S104 may entail extracting the effective speed ($\omega_E$) from a lookup table corresponding to the measured torque request level, with the effective speed ($\omega_E$) being a sufficiently high non-zero value, such as about 5-7 KPH or about 5-10 KPH. For instance, multiple data tables of sufficiently high resolution may be programmed into memory M of the controller 50 to cover a full range of possible torque request levels, including full or wide-open torque request as depicted in FIGS. 2A and 2C down to zero torque request as depicted in FIG. 2B. The method 100 proceeds to step S106 once the effective speed has been determined.

Step S106 includes calculating the effective power ($P_E$). For example, the controller 50 may determine the driver-requested output torque as a function of torque request level (TR %), e.g., using a torque-to-position table as is well known in the art. Once the driver-requested output torque is known, this value may be multiplied by the effective speed from step S104 to derive the effective power.

At step S108, the controller 50 determines whether the actual speed ($\omega_A$) of the vehicle 10 is about zero, e.g., less than about 5 KPH in an example embodiment. If so, the method 100 proceeds to step S110. The method 100 otherwise proceeds to step S112.

At step S110, having determined at step S108 that actual speed ($\omega_A$) is about zero, the controller 50 uses the derived effective power ($P_E$) from step S106 in executing a control action (CA1) with respect to the system 10. Step S110 may include transmitting the powertrain control signals (arrow CC of FIG. 1) to one or more torque-generating components of the powertrain 11, e.g., the electric machine 16 and/or the engine 12, and/or to the various electrical components described above with reference to FIG. 1. In this manner, the control action may entail selecting an appropriate powertrain operating mode.

Step S112 includes using executing another control action (CA2), including using the actual speed ($\omega_A$) to calculate the effective power ($P_E$). Steps S110 and S112 are effectively the same step in some embodiments, as step S106 entails calculating effective power using data tables or curves that could easily be extended to include non-zero actual speeds, such as is shown in FIGS. 2A-2C. In other words, as actual speed increases above a threshold speed, e.g., above point 38 of FIGS. 2A and 2C, actual and effective speeds are the same, and thus there is no difference between actual and effective power.

As a result of the execution of method 100, hybrid powertrain or other complex torque-generating system control methodologies may be reduced in complexity, thus easing the burden of calibration largely due to the use of a single control domain, i.e., the power domain. The method 100 may therefore overall improve system response at or near zero speed due to overcoming the existing inability to differentiate across torque levels at zero speed. Total power consumption of the system can be used, even at or near zero speed, as an input to several selection functions to command the most efficient operating state given current operating conditions.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A torque-generating system comprising:
   at least one torque-generating device;
   a transmission operatively connected to the at least one torque-generating device and having an output member; and
   a controller communicatively connected to the at least one torque-generating device and operable to control an operation of the system when the output member of the transmission is operating at or near zero output speed, wherein the controller is programmed to:
   determine a torque request level;
   determine an actual speed of the output member;
   determine an effective speed of the output member, as a calibrated non-zero value, using the determined torque request level when the determined actual speed of the output member is equal to zero, the controller extracting the effective speed from a lookup table in which effective speed is correlated with actual speed as a function of torque request level;
   calculate an effective power of the system using the determined effective speed and the determined torque request level; and
   execute a control action with respect to the system using the calculated effective power, the control action including transmitting control signals to the at least one torque-generating device to thereby select an appropriate operating mode of the system.

2. The torque-generating system of claim 1, wherein the at least one torque-generating device includes an internal combustion engine or an electric machine.

3. The torque-generating system of claim 1, wherein the at least one torque-generating device includes the internal combustion engine and the electric machine.

4. The torque-generating system of claim 1, further comprising a drive axle connected to a set of road wheels, wherein the torque-generating system is a vehicle powertrain.

5. The torque-generating system of claim 4, wherein the output member of the transmission is connected to the drive axle to thereby deliver output torque to the set of drive wheels, and wherein the determined actual speed is a measured rotational speed of the output member connected to the drive axle.

6. The torque-generating system of claim 1, wherein the controller includes a memory storing the lookup table as an effective speed logic block in which the effective speed corresponds to the determined torque request level.

7. The torque-generating system of claim 1, further comprising:
   a speed sensor operable to measure the actual speed; and
   a position sensor operable to measure the torque request level,
   wherein the controller is further programmed to determine the actual speed and the torque request level by receiving signals indicative of the actual speed and the torque request level from the speed sensor and the position sensor, respectively.

8. The torque-generating system of claim 1, wherein the controller is further programmed to calculate the effective power by determining a driver-requested output torque of the transmission as a function of the torque request level, and multiplying the calculated effective speed by the driver-requested output torque.

9. The torque-generating system of claim 1, wherein the effective speed is at least 5 kilometers per hour.

10. The torque-generating system of claim 1, further comprising a torque request input device configured to receive an output torque request from a user of the torque-generating system, wherein the determined torque request level is a percentage of the output torque request from the user.

11. The torque-generating system of claim 1, wherein the lookup table is composed of multiple data tables, the data tables including a positive torque request conditions data table, a negative torque request conditions data table, and a zero torque request data table.

12. A method for controlling a torque-generating system of a motor vehicle, the torque-generating system including a transmission having an output member and at least one torque-generating device operatively connected to the transmission, the method comprising:
    determining, via a vehicle controller of the motor vehicle, a torque request level and an actual speed of the output member of the transmission;
    determining, via the vehicle controller, an effective speed of the output member, as a calibrated non-zero value, using the determined torque request level when the determined actual speed of the output member is near or equal to zero, the vehicle controller extracting the effective speed from a lookup table in which effective speed is correlated with actual speed as a function of torque request level;
    calculating, via the vehicle controller, an effective power of the torque-generating system using the determined effective speed and the received torque request level; and
    executing a control action with respect to the torque-generating system using the calculated effective power, the control action including the vehicle controller transmitting powertrain control signals to the at least one torque-generating device to thereby select an operating mode of the system.

13. The method of claim 12, wherein the at least one torque-generating device includes an internal combustion engine or an electric machine.

14. The method of claim 12, wherein the at least one torque-generating device includes the internal combustion engine and the electric machine.

15. The method of claim 12, further comprising a drive axle connected to a set of road wheels, wherein the torque-generating system is a vehicle powertrain.

16. The method of claim 12, wherein the vehicle controller includes a memory storing the lookup table as an effective speed logic block in which the effective speed corresponds to the determined torque request level.

17. The method of claim 12, further comprising:
    receiving an actual speed signal from a speed sensor operable to measure the actual speed of the transmission output member; and
    receiving an output torque signal from a position sensor operable to measure the torque request level, wherein the vehicle controller determines the actual speed and the torque request level from the signals received from the speed sensor and the position sensor, respectively.

18. The method of claim 12, wherein calculating the effective power includes determining a driver-requested output torque of the transmission as a function of the torque request level and then multiplying the calculated effective speed by the driver-requested output torque.

19. The method of claim 12, wherein the effective speed is at least 5 kilometers per hour.

20. A hybrid electric vehicle comprising:
an engine;
an electric machine;
a pair of drive wheels;
a transmission drivingly connected to the engine and the electric machine, the transmission having an output member drivingly connected to the pair of drive wheels;
a torque request input device configured to receive output torque requests from a user of the vehicle;
an output speed sensor operatively connected to the transmission and configured to detect rotational speeds of the output member; and
a hybrid control module communicatively connected to the engine, the electric machine, the torque request input device, and the output speed sensor, the hybrid control module being programmed with power-based control logic and computer-readable instructions to:
determine a torque request level from an output torque request signal received from the torque request input device;
determine an actual speed of the transmission output member drivingly connected to the drive wheels from a rotational speed signal received from the output speed sensor;
determine an effective speed of the output member, as a calibrated non-zero value, using the determined torque request level when the determined actual speed of the output member is near or equal to zero, the controller extracting the effective speed from a lookup table in which effective speed is correlated with actual speed as a function of torque request level;
calculate an effective power of the system using the determined effective speed and the determined torque request level; and
transmitting a control signal to the engine or the electric machine, or both, to thereby select an operating mode of the system based on the calculated effective power.

* * * * *